US008783119B2

(12) United States Patent
Little

(10) Patent No.: US 8,783,119 B2
(45) Date of Patent: Jul. 22, 2014

(54) VANE ARM TESTING RIG

(71) Applicant: United Technologies Corporation, Hartford, CT (US)

(72) Inventor: Jonathan D. Little, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 107 days.

(21) Appl. No.: 13/627,124

(22) Filed: Sep. 26, 2012

(65) Prior Publication Data

US 2014/0083208 A1 Mar. 27, 2014

(51) Int. Cl.
*G01L 1/00* (2006.01)

(52) U.S. Cl.
USPC ........................................ 73/862.381; 73/147

(58) Field of Classification Search
USPC ...................... 73/147, 760, 862.338, 862.381
See application file for complete search history.

(56) References Cited

U.S. PATENT DOCUMENTS 4,806,848 A * 2/1989 Demers ......................... 324/662
4,845,992 A 7/1989 Dean
5,097,711 A * 3/1992 Rozelle et al. .................. 73/660
5,339,036 A * 8/1994 Clark et al. ................... 324/338
6,047,596 A 4/2000 Krug et al.
6,341,238 B1 1/2002 Modeen et al.
6,393,904 B1 5/2002 Krug et al.
7,011,494 B2 3/2006 Kies et al.
7,971,473 B1 * 7/2011 Meunier et al. ............ 73/112.01
7,987,721 B2 * 8/2011 Schulz et al. ................... 73/620
8,202,043 B2 6/2012 McCaffrey
8,215,902 B2 7/2012 Major et al.
8,353,204 B2 * 1/2013 Mitaritonna et al. ........... 73/147
8,621,934 B2 * 1/2014 Hughes et al. .................. 73/808
8,650,970 B2 * 2/2014 Guy ......................... 73/862.381
2003/0228069 A1 * 12/2003 Leboeuf ........................ 382/286

* cited by examiner

*Primary Examiner* — Max Noori

(74) *Attorney, Agent, or Firm* — Carlson, Gaskey & Olds, P.C.

(57) ABSTRACT

An example vane arm testing rig includes a base having a first attachment configured to receive a first end of a vane arm when the vane arm is in an engaged position, and a torque member having a second attachment configured to receive an opposing, second end of the vane arm when the vane arm is in the engaged position. The vane arm extends along a longitudinal axis from the first end to the second end. The first and second attachments are configured to rotate relative to each other about the axis. The first and second attachments are configured to move laterally relative to each other.

19 Claims, 7 Drawing Sheets

112
84
72
108
88
106
104
64
80
76
100
74

VANE ARM TESTING RIG

BACKGROUND

This disclosure relates generally to vane arms and, more particularly, to testing a vane arm in a simulated operating.

Turbomachines, such as gas turbine engines, typically include a fan section, a compression section, a combustion section, and a turbine section. Turbomachines may employ a geared architecture connecting portions of the compression section to the fan section.

Some turbomachines include variable vanes. For example, the first two stages of a low-pressure compressor of the turbomachine may include variable vanes that are selectively actuated between positions that permit more flow and positions that permit less flow. The variable vanes are actuated to influence flow through the low-pressure compressor.

A vane arm is typically associated with each of the variable vanes. Moving the vane arm actuates the variable vane. During operation of the turbomachine, the vane arm is subject to various loads, such as twisting loads, bending loads, and loads associated with flow through the turbomachine. Designing vane arms may be difficult due to the various loads that must be accounted for.

SUMMARY

A vane arm testing rig according to an exemplary aspect of the present disclosure includes, among other things, a base having a first attachment configured to receive a first end of a vane arm, and a torque member having a second attachment configured to receive an opposing, second end of the vane arm. The vane arm extends along a longitudinal axis from the first end to the second end. The first and second attachments are configured to rotate relative to each other about the axis. The first and second attachments are configured to move laterally relative to each other.

In a further non-limiting embodiment of the foregoing vane arm testing rig, the torque member is pivotably coupled to the base.

In a further non-limiting embodiment of either of the foregoing vane arm testing rigs, a carrier may hold the torque member.

In a further non-limiting embodiment of any of the foregoing vane arm testing rigs, links pivotably secure the carrier to the base.

In a further non-limiting embodiment of any of the foregoing vane arm testing rigs, the links comprise a four bar linkage.

In a further non-limiting embodiment of any of the foregoing vane arm testing rigs, the first and second attachments permit relative pivoting of the vane arm.

In a further non-limiting embodiment of any of the foregoing vane arm testing rigs, the relative pivoting is about pivot axes that are generally perpendicular to the longitudinal axis.

In a further non-limiting embodiment of any of the foregoing vane arm testing rigs, a measurement device is configured to measure strain on the vane arm when the first and second attachments have rotated and moved laterally relative to each other.

In a further non-limiting embodiment of any of the foregoing vane arm testing rigs, the vane arm is in a test position outside a turbomachine when the vane arm is received by the first and second attachments.

A vane arm testing rig according to another exemplary aspect of the present disclosure includes a first pivot configured to hold a first end of a vane arm and a second pivot configured to hold an opposing, second end of the vane arm. The first and second pivots are movable relative to each other between a start position to a test position. The first and second pivots in the test position are circumferentially displaced relative to the first and second pivots in the start position. The first and second pivots in the test position are laterally displaced relative to the first and second pivots in the start position.

In a further non-limiting embodiment of the foregoing vane arm testing rigs, the torque member is coupled to the base.

In a further non-limiting embodiment of either of the foregoing vane arm testing rigs, a carrier holds the torque member.

In a further non-limiting embodiment of any of the foregoing vane arm testing rigs, links pivotably secures the carrier to the base.

In a further non-limiting embodiment of any of the foregoing vane arm testing rigs, the vane arm in the test position is outside a turbomachine.

A method of testing a vane arm according to another exemplary aspect of the present disclosure includes, among other things, securing a first end of a vane arm to a first attachment location, securing an opposing second end of the vane arm to a second attachment location, rotating the first attachment location relative to the second attachment location, and translating the first attachment location relative to the second attachment location.

In a further non-limiting embodiment of the foregoing method of testing a vane arm, the method includes measuring strain on the vane arm.

In a further non-limiting embodiment of the foregoing method of testing a vane arm, the method includes pivoting the first and about the first attachment location, and pivoting the second and about the second attachment location during the translating.

In a further non-limiting embodiment of the foregoing method of testing a vane arm, the method includes coupling the first attachment location to the second attachment location utilizing a four bar linkage.

In a further non-limiting embodiment of the foregoing method of testing a vane arm, the method includes applying torque to the first attachment

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
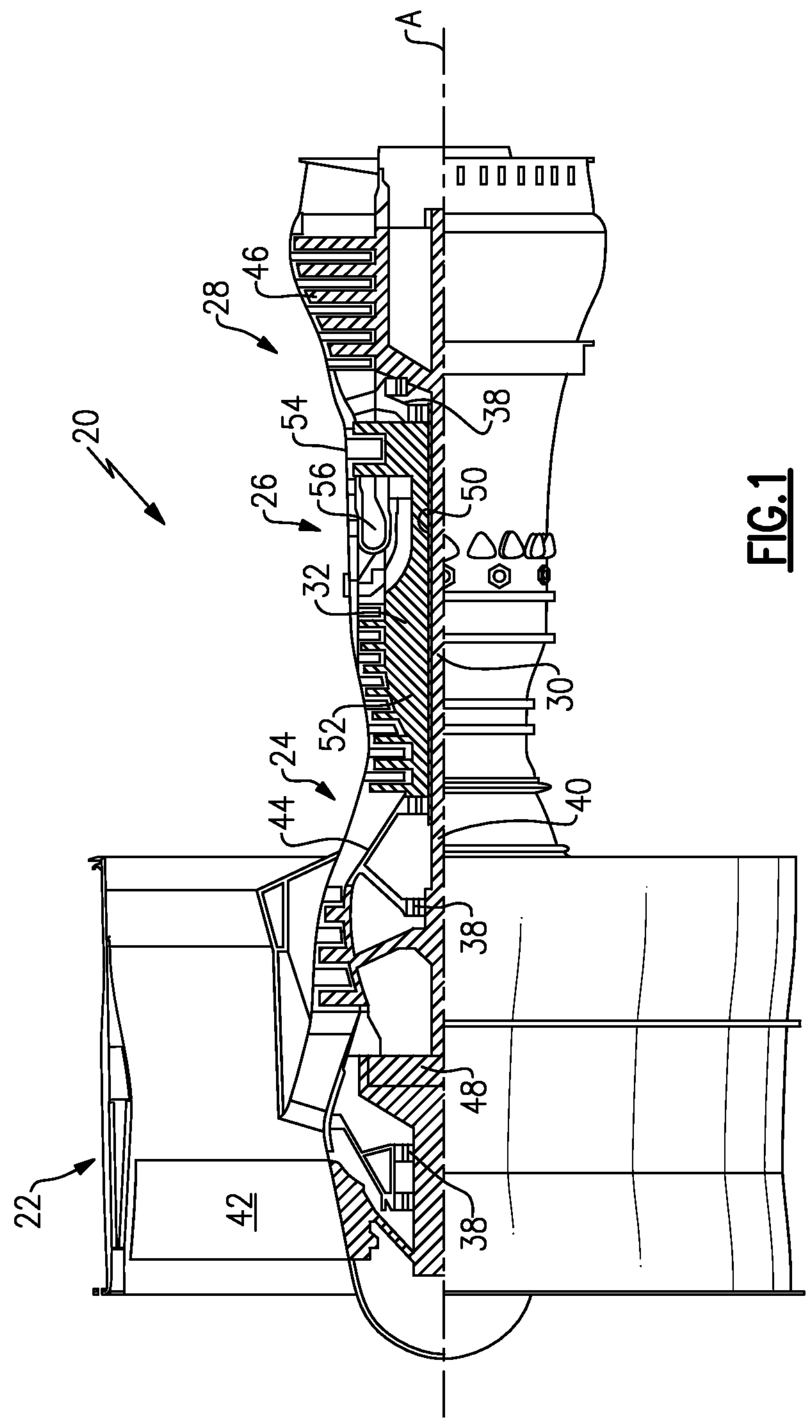
FIG. 1 shows a cross-section view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications.

In the example engine 20, flow moves from the fan section 22 to a bypass flowpath. Flow from the bypass flowpath generates forward thrust. The compression section 24 drives air along a core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

Low Corrected Fan Tip Speed is the actual fan tip speed divided by an industry standard temperature correction of Temperature divided by 518.7^0.5. That is, $[(\text{Tram } °\text{R})/(518.7°\text{R})]^{0.5}$. The Temperature represents the ambient temperature in degrees Rankine. The Low Corrected Fan Tip Speed according to one non-limiting embodiment of the example engine 20 is less than about 1150 fps (351 m/s).

Figure 2:
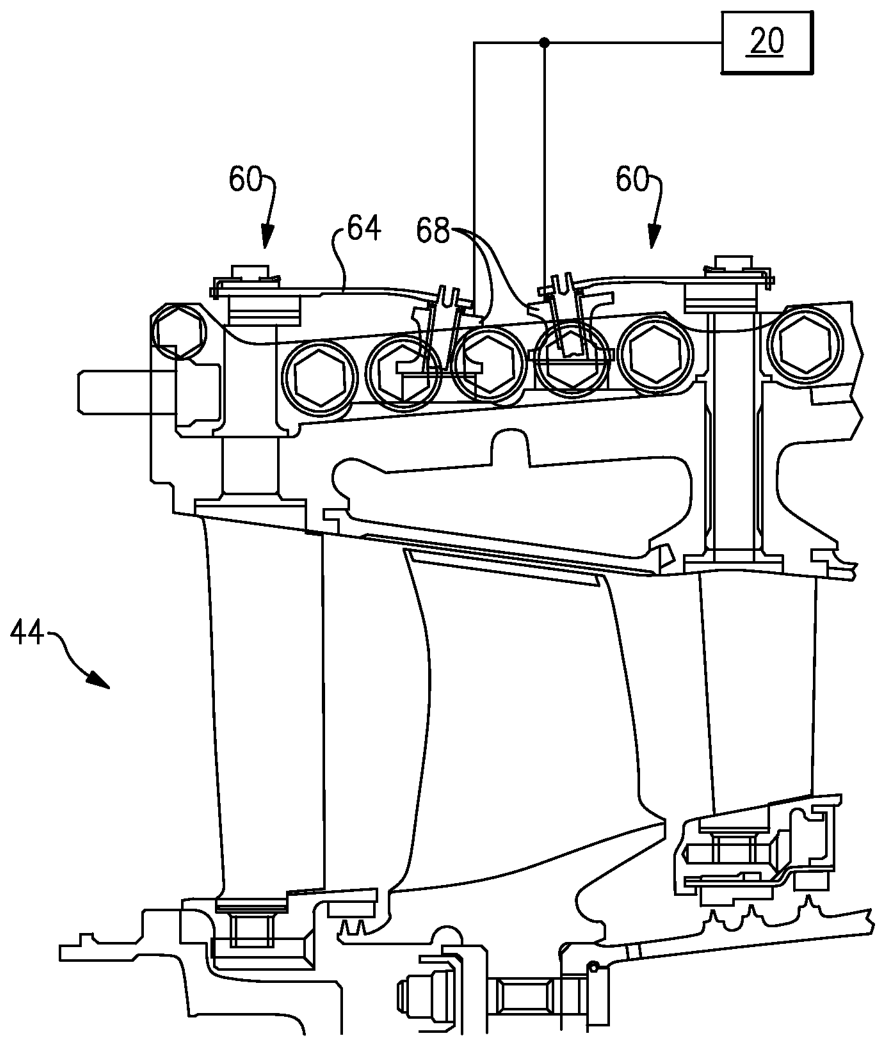
FIG. 2 shows a close up section view of a portion of FIG. 1.
Figure 4:
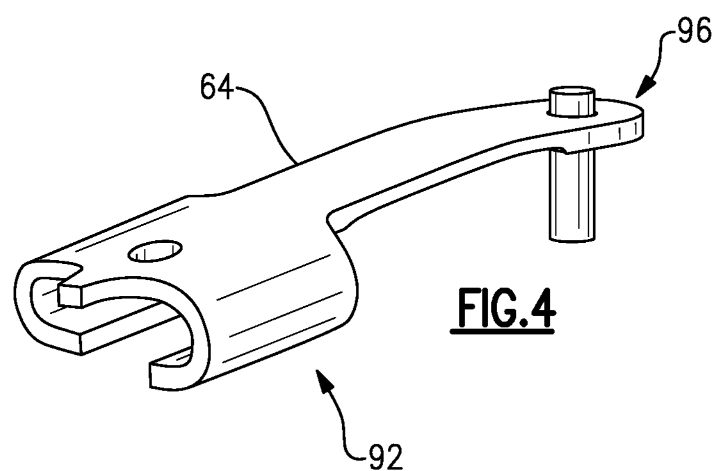
FIG. 4 shows a perspective view of the vane arm of FIG. 3.
Figure 3:
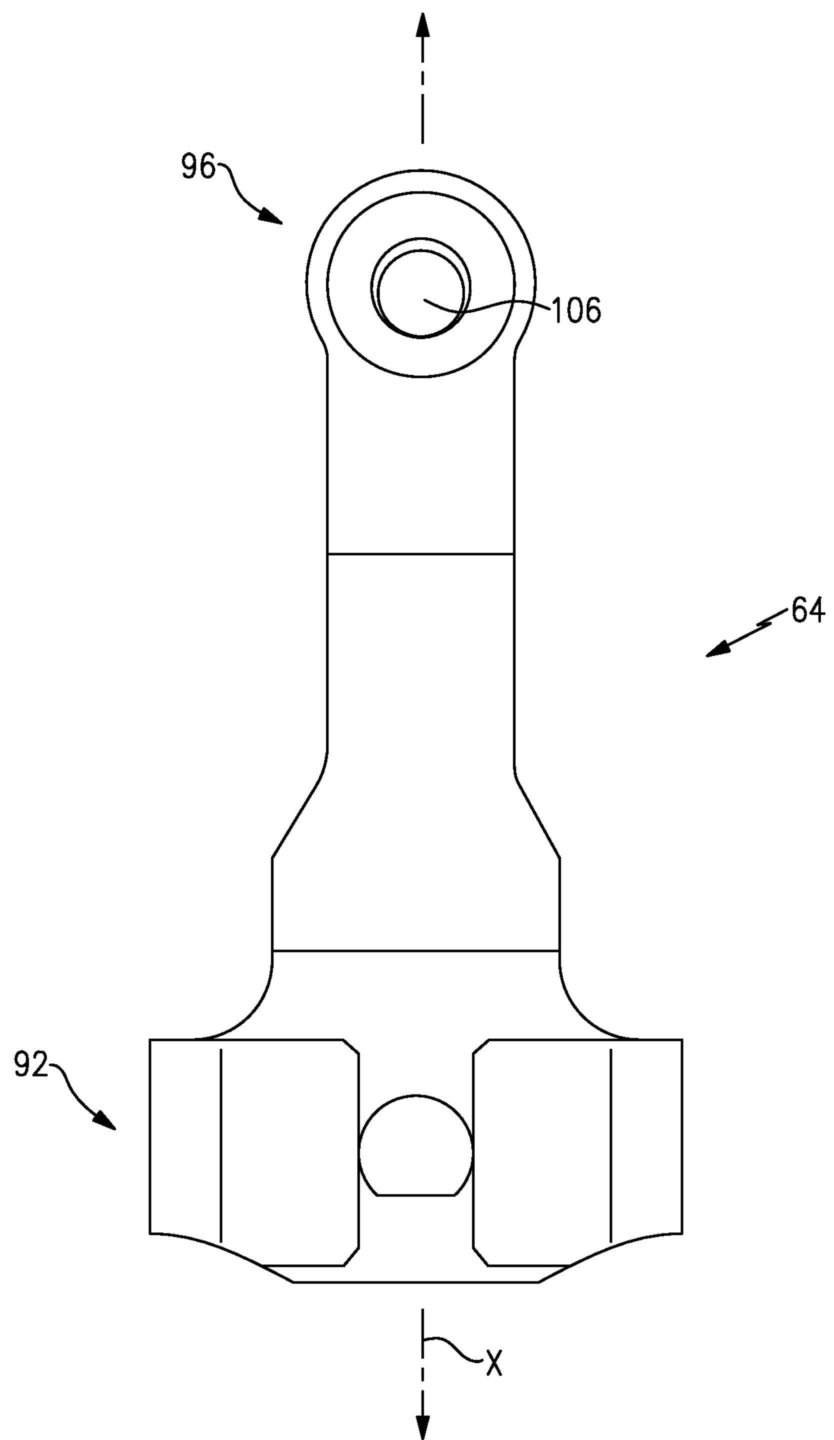
FIG. 3 shows a top view of one of the vane arms.
Figure 6:
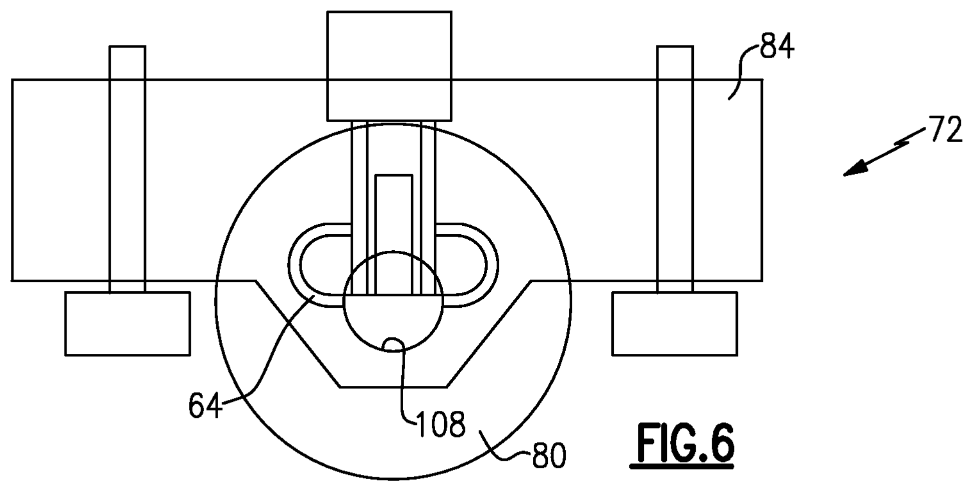
FIG. 6 shows an end view of the FIG. 3 vane arm and test rig.
Figure 5:
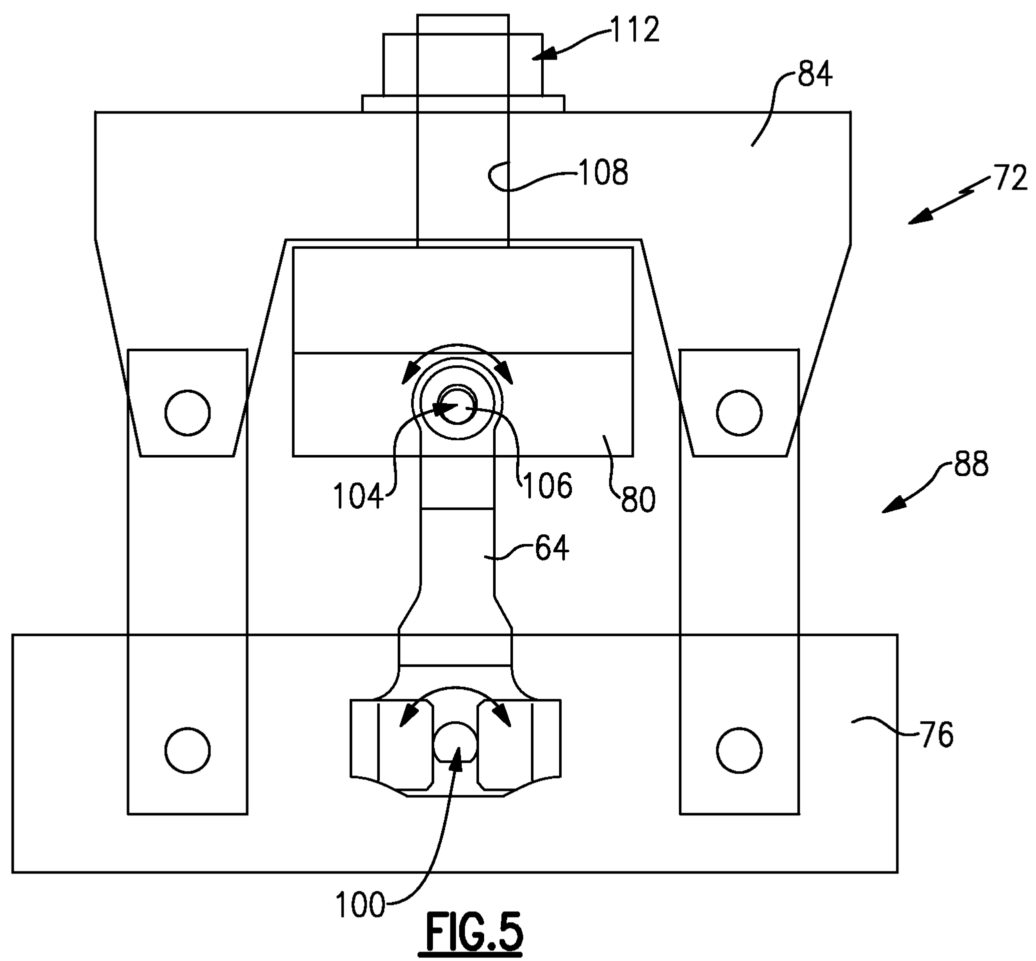
FIG. 5 shows a top view of the vane arm of FIG. 3 within a vane test rig in a start position.
Figure 8:
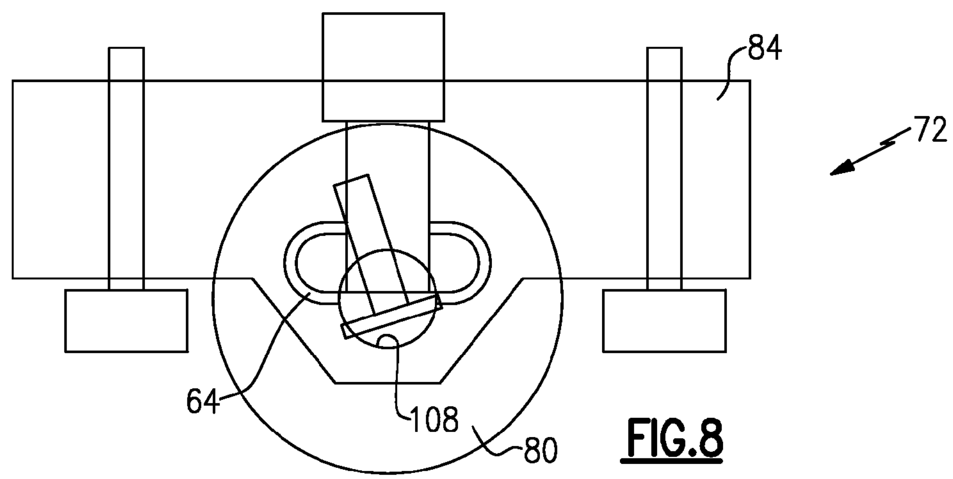
FIG. 8 shows an end view of the FIG. 7 vane arm and test rig.
Figure 7:
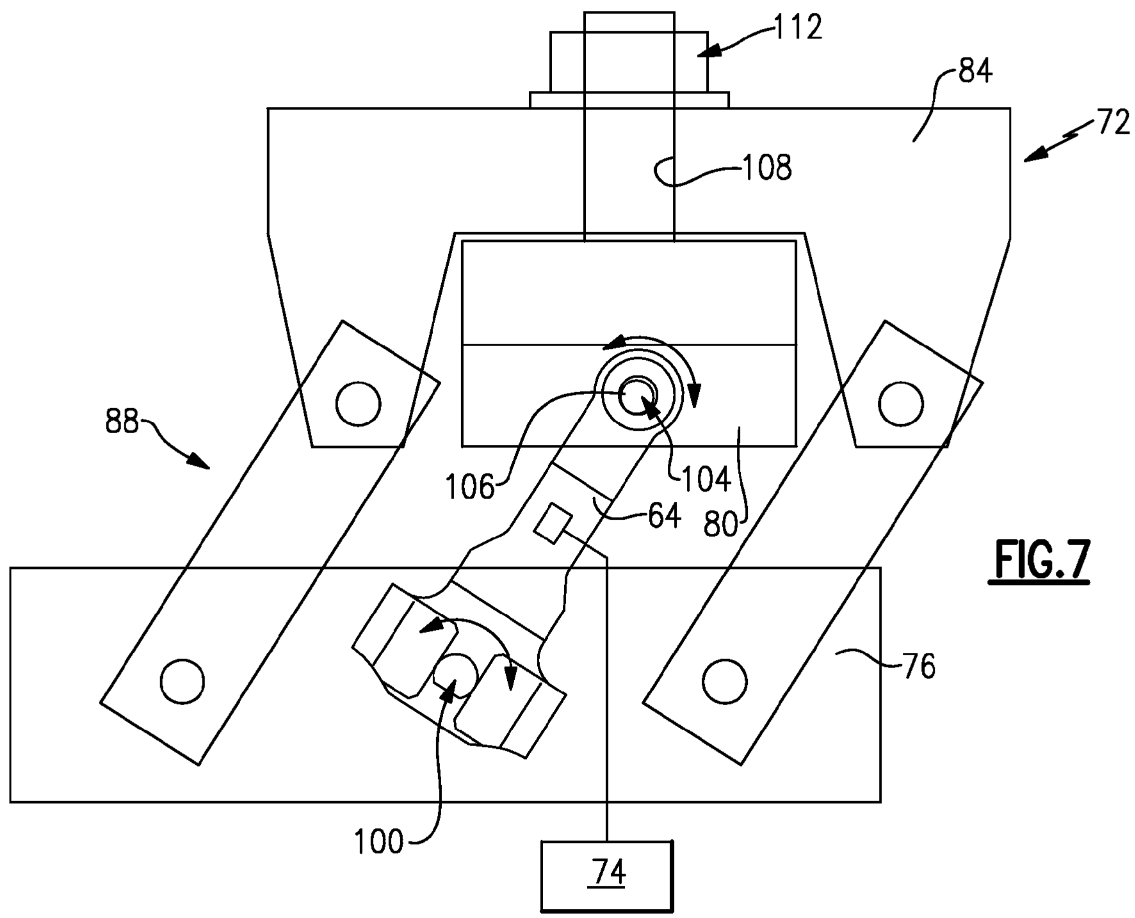
FIG. 7 shows a top view of the vane arm of FIG. 3 within the vane test rig in a test position.
Figure 9:
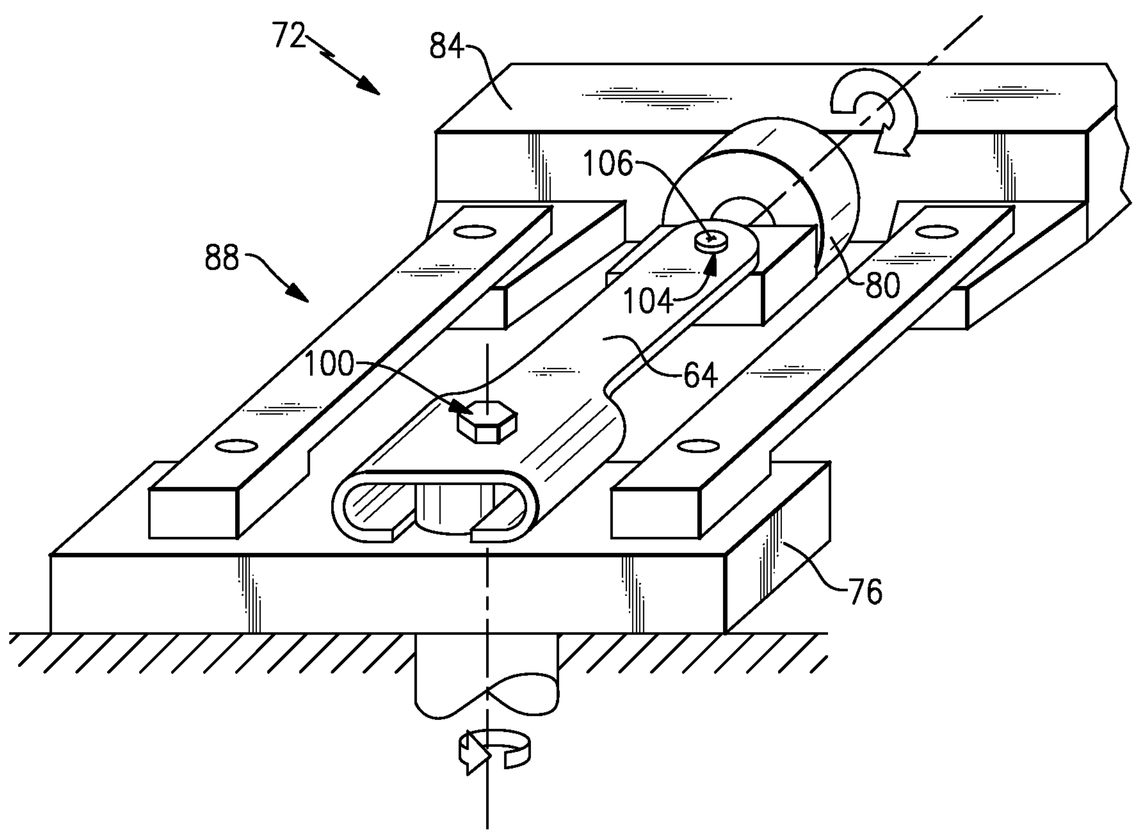
FIG. 9 shows a perspective view of the variable vane testing rig of FIGS. 5 to 8.

Referring now to FIG. 2, the first two stages 58 of the low-pressure compressor 44 include arrays of variable vanes 60. A vane arm 64 is associated with each of the variable vanes 60. Each vane arm 64 couples one of the variable vanes 60 to a sync ring 68.

The sync ring 68 is moved during operation. A controller 70, for example, may be operably linked to the sync ring 68 to control movements of the sync ring 68 during operation of the engine 20. Moving of the sync ring 68 moves the vane arms 64, which causes the variable vanes 60 to pivot about radially extending axes.

Pivoting the variable vanes 60 moves the variable vanes 60 between positions that permit more flow through the stages 58 and positions that permit less flow through the stages 58. Thus, the controller 70 may influence flow through the low-pressure compressor 44 by moving the sync ring 68, to move the vane arms 64, to pivot the variable vanes 60.

Although the vane arm 64, in this example, are associated with the first two stages 58 of the low-pressure compressor 44, various other stages of the engine 20 may include vane arms, including, for example, the first four stages of the high-pressure compressor 52.

Referring now to FIGS. 3 to 9, an example vane arm testing rig 72 is utilized to test one of the vane arms 64. When tested within the rig 72, the vane arm 64 is in an uninstalled position outside the engine 20. The rig 72 is used to manipulate the vane arm 64 into positions so the vane arm 64 will experience loads similar to what the vane arm 64 will experience within the engine 20. Peak loads on the vane arm 64, for example, can then be measured. Measurements other than loads can also be taken from the vane arm 64 manipulated into position by the testing rig 72. The measurements may utilize a strain gauge, another measurement device 74, or both.

The example rig 72 includes a base 76 and a torque member 80 (or wheel). The torque member 80 is held by a carrier 84, which is coupled to the base 76 with a link assembly 88. In this example, the link assembly 88 is a four bar linkage.

The vane arm 64 extends along a longitudinal axis X from a first end 92 to a second end 96. The base 76, in this example, includes a first attachment 100 that engages the first end 92 of the vane arm. The torque member 80, in this example, has a second attachment 104 that engages the second end 96 of the vane arm 64.

In this example, the first attachment 100 is a post or pivot. The vane arm 64 is pivotable relative to the first attachment 100 about a post pivot axis that is, in this example, perpendicular to the longitudinal axis X. In some examples, this pivoting may be limited to the maximum pivoting that the first end 92 of the vane arm 64 will experience within the engine 20.

The example first attachment 100 simulates the connection between the vane stem 64 and the variable vane 60 within the engine. That is, the first attachment 100 provides an interface similar to what the vane arm 64 will engage within the engine 20.

In this example, the second attachment 104 is a bore or pivot that receives a post 106 (or pin end) of the vane arm 64. The vane arm 64 is pivotable relative to the second attachment 104 about a post pivot axis that is, in this example, perpendicular to the longitudinal axis X. In some examples, this pivoting may be limited to the maximum pivoting that the second end 96 of the vane arm 64 will experience within the engine 20.

The example second attachment 104 simulates the connection between the vane stem 64 and the sync ring 68 within the engine 20. That is, the first attachment 100 provides an interface similar to what the vane arm 64 will engage within the engine 20.

In the example rig 72, the torque member 80 (and the second attachment 104) are rotatable relative to the carrier 84 and the base 76. The torque member 80 may include a stem that rotates within a bore 108 established within the carrier 84. A mechanical fastener 112, such as a nut, may be used to clamp the torque member 80 to the carrier 84 and hold the torque member 80 in a desired rotational position relative to the carrier 84. The angle of the torque member 80 will be a function of the sync ring 68 diameter and the angle of the vane arm 64.

The rotational position of the first attachment 100 is held when the torque member 80 is rotated. Thus, rotating the torque member 80 causes the vane arm 64 to twist about the axis X.

The link assembly 88 permits the carrier 84 and the torque member 80 to move back and forth laterally relative to the base 76. The example links with the link assembly 88 pivot relative to both the base 76 and the carrier 84 when the base 76 and the carrier 84 are moved laterally relative to each other. Links of varying lengths may be used to accommodate different vane arm lengths or allowing the torque member 80 to slide in and out of the carrier 84 to accommodate different length vane arms 64.

The rotational position of the first attachment 100 may be held when the carrier 84 is moved laterally. Moving the carrier 84 laterally causes the second attachment 104 to move laterally relative to the first attachment 100. A fastening system (not shown) may be used to hold the relative lateral positions of the base 76 and the carrier 84.

The example rig 72 is able to manipulate the relative positions of the first attachment 100 and the second attachment 104 to load the vane arm 64. In an example start position (FIGS. 5 and 6), the vane arm 64 experiences relatively little load. In an example testing position (FIGS. 7 and 8), the vane arm 64 experiences twisting loads about the axis X and loads associated with relative laterally movement of the opposing ends of the vane arms 64. The movement of the first attachment 100 and the second attachment 104 load is at angles in two separate planes.

In the testing position, the movement of the first attachment 100 and the second attachment 104 can be adjusted to simulate various positions of the vane arm 64 during operation of the engine 20. The vane arm testing rig 72 provides a relatively easy access to the vane arm 64 in both the start and testing positions. In the testing position, strain gauges may be utilized to monitor stress and strain on the vane arm 64. In the testing position, torque loads representing aero loading on the vane are applied at the first attachment.

Figure 10:
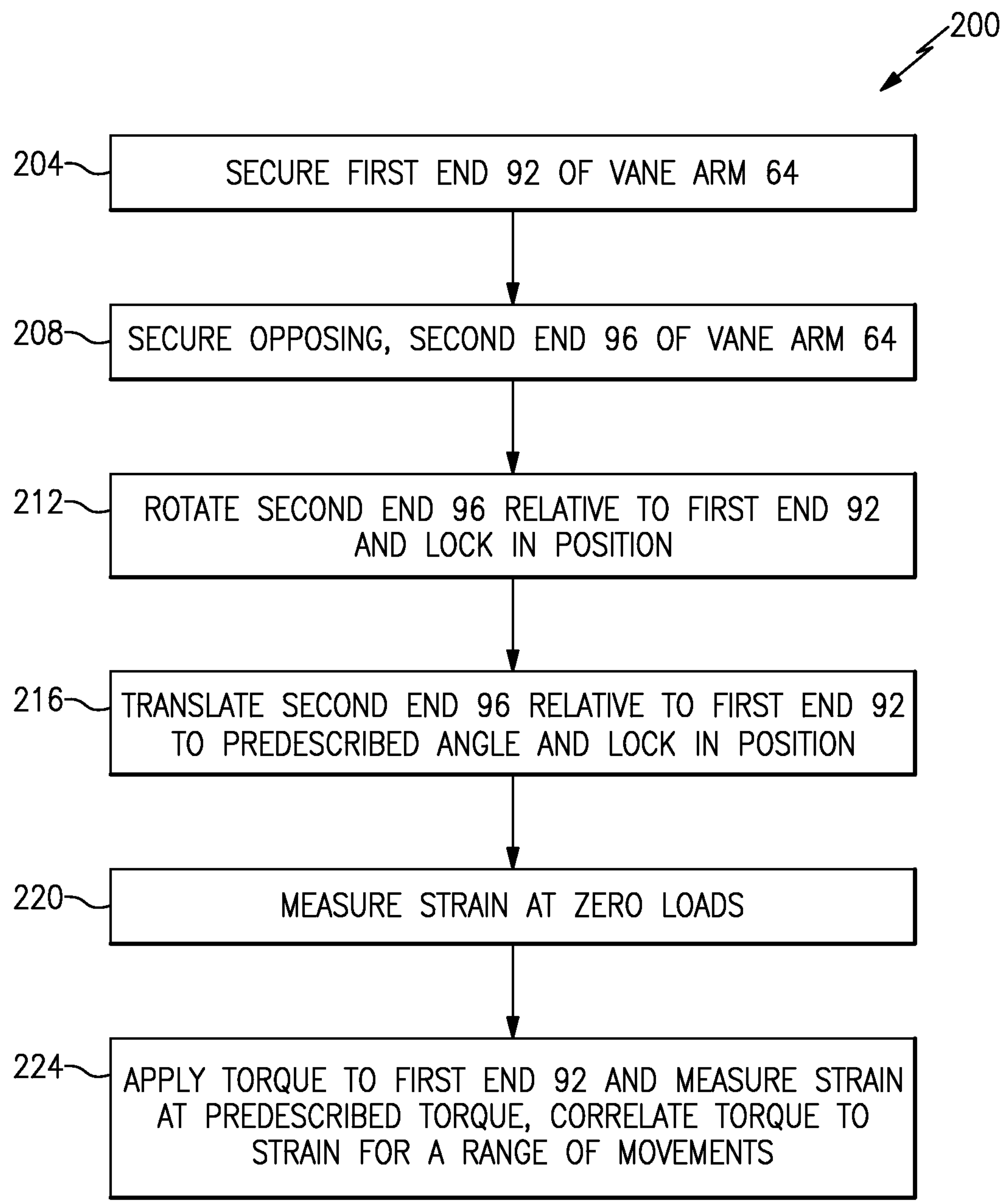
FIG. 10 shows the flow of an example method of testing the vane arm of FIGS. 3 and 4 utilizing the test rig of FIGS. 6 to 9.

Referring now to FIG. 10 with reference to FIG. 2, an exemplary method 200 of testing the vane arm 64 includes a step 204 of securing the first end 92 of the vane arm 64. The first end 92 may be a claw end of the vane arm 64. The method includes a step 208 of securing an opposing, second end 96 of the vane arm 64 to a second attachment location. The method 200 rotates the second end 96 relative to the first end 92 at a step 212 to circumferentially displace the first and second ends 92, 96. The first and second ends 92, 96 may then be locked in the rotated position.

The method 200 translates the second end 96 relative to the first end 92 at a step 216 and may then lock the first and second ends 92, 96 in this position. The method may translate and then rotate, rotate and then translate, or translate and rotate at the same time. The method may then, at a step 220, measure loads on the vane arm 64, or calibrate strain gauges that are then used within the engine to measure vane loads. In other examples, deflection of the vane arm 64 is measured. The measurements may include measuring strain on the vane arm 64 at zero load. The measurements may include applying a torque to the first end 92 and measuring strain at a certain torque at a step 224. The torque may also be correlated to strain for a range of movements at the step 224.

Features of the disclosed examples include a testing rig that can move a vane arm to positions representing the vane arm's positions during operation of an engine. Accurately measuring loads on the vane arm may provide information about whether the vane arm requires stiffening or softening.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A vane arm testing rig, comprising:

a base having a first attachment configured to receive a first end of a vane arm; and a torque member having a second attachment configured to receive an opposing, second end of the vane arm, the vane arm extending along a longitudinal axis from the first end to the second end, wherein the first and second attachments are configured to rotate relative to each other about the axis, and the first and second attachments are configured to move laterally relative to each other.

2. The vane arm testing rig of claim 1, wherein the torque member is pivotably coupled to the base.

3. The vane arm testing rig of claim 1, including a carrier that holds the torque member.

4. The vane arm testing rig of claim 3, including links that pivotably secure the carrier to the base.

5. The vane arm testing rig of claim 4, wherein the links comprise a four bar linkage.

6. The vane arm testing rig of claim 1, wherein the first and second attachments permit relative pivoting of the vane arm.

7. The vane arm testing rig of claim 6, wherein the relative pivoting is about pivot axes that are generally perpendicular to the longitudinal axis.

8. The vane arm testing rig of claim 1, including a measurement device configured to measure strain on the vane arm when the first and second attachments have rotated and moved laterally relative to each other.

9. The vane arm testing rig of claim 1, wherein the vane arm is in a test position outside a turbomachine when the vane arm is received by the first and second attachments.

10. A vane arm testing rig comprising:

a first pivot configured to hold a first end of a vane arm;

a second pivot configured to hold an opposing, second end of the vane arm, the first and second pivots movable relative to each other between a start position to a test position, the first and second pivots in the test position being circumferentially displaced relative to the first and second pivots in the start position, the first and second pivots in the test position being laterally displaced relative to the first and second pivots in the start position.

11. The vane arm testing rig of claim 10, wherein the torque member is coupled to the base.

12. The vane arm testing rig of claim 10, including a carrier that holds the torque member.

13. The vane arm testing rig of claim 12, including links that pivotably secures the carrier to the base.

14. The vane arm testing rig of claim 10, wherein the vane arm in the test position is outside a turbomachine.

15. A method of testing a vane arm, comprising:

securing a first end of a vane arm to a first attachment location;

securing an opposing second end of the vane arm to a second attachment location;

rotating the first attachment location relative to the second attachment location;

translating the first attachment location relative to the second attachment location.

16. The method of claim 15, including measuring strain on the vane arm.

17. The method of claim 15, including pivoting the first and about the first attachment location, and pivoting the second and about the second attachment location during the translating.

18. The method of claim 15, including coupling the first attachment location to the second attachment location utilizing a four bar linkage.

19. The method of claim 15, including applying torque to the first attachment.

* * * * *